Jan. 29, 1957  P. RICHARTZ  2,779,238
PHOTOGRAPHIC LENS MOUNT
Filed May 23, 1955
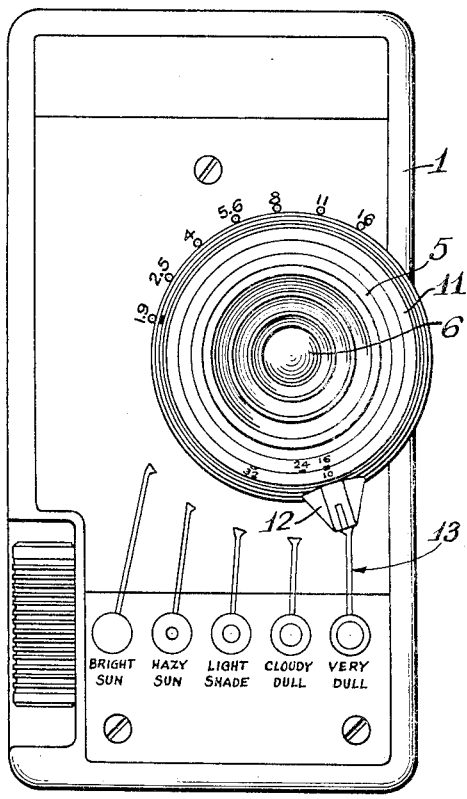
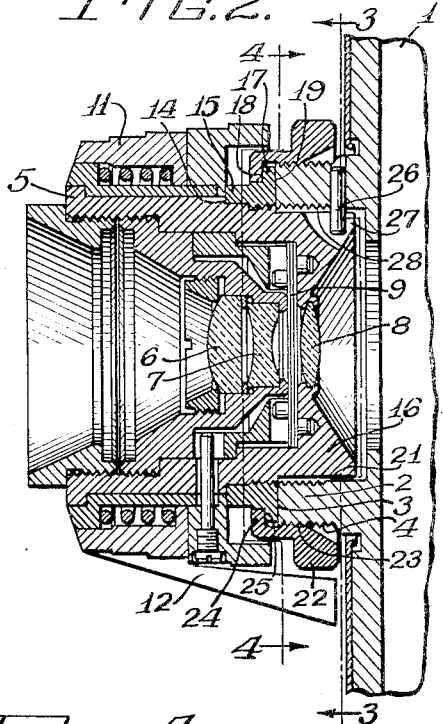
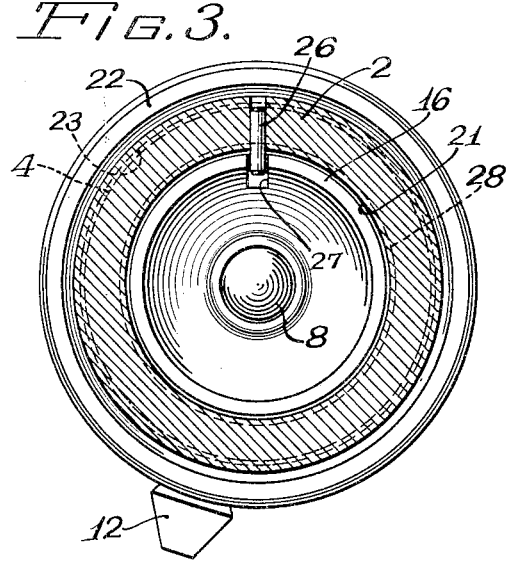
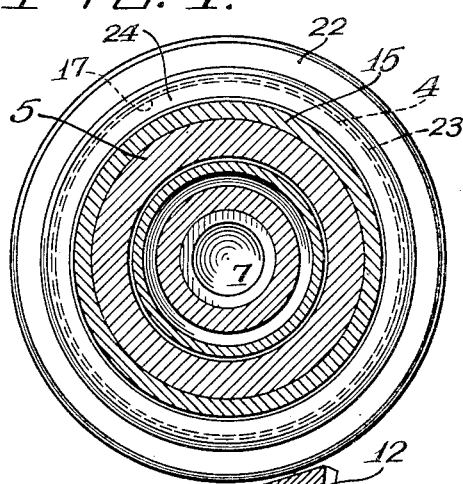
Inventor:
Paul Richartz
By Robert F. Miehle Jr. Atty.

United States Patent Office 2,779,238
Patented Jan. 29, 1957

2,779,238

PHOTOGRAPHIC LENS MOUNT

Paul Richartz, Lincolnwood, Ill., assignor to Bell & Howell Company, Chicago, Ill., a corporation of Illinois Application May 23, 1955, Serial No. 510,370

7 Claims. (Cl. 88—57)

My invention relates particularly to a lens mount for photographic lenses.

Objects of my invention reside in the provision of a desirable and effective lens mount which provides for the convenient mounting and dismounting of a lens on a support forming a part of the mount, which while employing a screwthreaded connection for securing the lens on the support does not require relative rotation of the lens and support for the mounting and dismounting of the lens, which provides for predeterminately relatively angularly positioning of the lens on the support, and which provides for the interchangeable mounting on the support of a lens provided with a conventional externally screwthreaded and shouldered mounting structure.

The invention will be better understood by reference to the accompanying drawings forming a part hereof and in which—

Figure 1 is a front elevation of a motion picture camera having a photographic lens mounted thereon by means of the mounting structure of my invention;

Figure 2 is a partial sectional view of the same taken on an axial plane of the lens and lens mount assembly;

Figure 3 is a sectional view taken on the line 3—3 of Figure 2; and

Figure 4 is a sectional view taken on the line 4—4 of Figure 2.

Referring to the drawings, and particularly Figures 1 and 2, the case 1 of a motion picture camera is provided at its front wall with a forwardly projecting axially bored cylindrical hub 2 forming a lens support and having its front end surface 3 forming an axially facing annular seating surface, and the hub is externally screwthreaded as designated at 4.

The lens comprises a main lens sleeve 5 and a photographic lens, comprising three spaced lens elements 6, 7 and 8, mounted within the sleeve in coaxial relation therewith in a manner unnecessary to be described, and an adjustable exposure diaphragm mechanism is carried by the sleeve and comprises an adjustable exposure diaphragm 9 within the sleeve and means connected with the diaphragm for adjusting the same and comprising an adjustment ring 11 mounted for angular adjustment on the forward portion of the lens sleeve and provided with an indexing arm 12 which cooperates with an indexing scale 13 on the front face of the camera case 1 for predeterminately adjusting the diaphragm. The adjustable exposure diaphragm mechanism shown forms the subject matter of my application for patent of the United States, Serial No. 510,272, filed May 23, 1955, for improvement in Adjustable Exposure Diaphragm Mechanism, and a detailed description thereof is unnecessary herein.

The main lens sleeve 5 is reduced rearwardly thereof and is thereby provided with an intermediate rearwardly facing external annular shoulder 14, and a ring 15 is screwthreaded on the reduced portion of the sleeve and forwardly against the shoulder 14 to secure the ring on the sleeve so that it forms a part thereof. The ring 15 is disposed forwardly of the rear end portion 16 of the sleeve, and is provided with an external circumferential flange 17 disposed inwardly of this sleeve end portion and providing oppositely axially facing external annular shoulders 18 and 19 on the sleeve.

The sleeve end portion 16 is engageable within the bore 21 of the support hub 2, and the rearwardly facing shoulder 19, which faces in the direction of this sleeve end portion, provides a seating surface which is engageable against the seating surface 3 of the hub 2 when the sleeve end portion is engaged in the bore 21 of the support hub to axially position the sleeve on the hub, as will be observed in Figure 2.

A ring 22 is rotatably engaged on the ring 15 and overlies the flange 17, and so is rotatable on the lens sleeve 5. This ring is internally screwthreaded as designated at 23, and is provided with an internal annular flange 24, providing an annular axially facing shoulder 25 engageable rearwardly against the shoulder 18 of the ring 15. The ring 22 is adapted to be screwthreaded on the support hub 2, by means of engagement of the internal screwthread 23 of this ring with the external screwthread 4 of the support hub, with the sleeve end portion 16 engaged in the bore 21 of the support hub and with the support hub and lens sleeve seating surfaces 3 and 19 engaged against each other, as shown in Figure 2, thus providing for conveniently mounting the lens sleeve on the support hub and dismounting the lens sleeve from the support hub, it being observed that rotation of the lens sleeve is not required for the mounting and dismounting thereof.

The support hub 2 is provided internally thereof with a key 26 in the form of a radial pin projecting inwardly of the bore thereof, and the end portion 16 of the lens sleeve 5 is provided with a keyway 27 which engages the key 26 when the lens sleeve is mounted on the support hub to predeterminately angularly position the lens sleeve on the support hub, the key and keyway being engageable and disengageable with relative axial movement of the lens sleeve and support hub. Thus, cooperative relation of the indexing arm 13 with the indexing scale 12 is assured as an incident of mounting the lens sleeve on the support hub.

The support hub 2 is internally screwthreaded, as designated at 28, and the key 26 is spaced inwardly from the seating surface 3 of the support hub, so that a lens having the sleeve thereof provided with a conventional externally threaded and shouldered mount structure may be mounted on the support hub in place of a lens the sleeve of which is provided with the mounting structure of my invention.

While I have thus described my invention, I do not wish to be limited to the precise details described, as changes may be made without departing from the teaching of my invention.

I claim:

1. In a lens mount, the combination of an axially bored externally screwthreaded cylindrical support provided with an axially facing annular seating surface, a lens sleeve provided with an end portion engageable within the bore of said support and provided with an external circumferential flange inwardly of said end portion and providing oppositely axially facing shoulders of which the shoulder facing in the direction of said end portion provides a seating surface engageable against said first mentioned seating surface when said sleeve end portion is engaged in said support bore, and an internally screwthreaded ring rotatable on said lens sleeve and overlying said flange and provided with an internal annular axially facing shoulder engageable against the other of said flange shoulders, said ring being adapted to be screwthreaded on said support to mount said lens sleeve thereon with said sleeve end portion engaged in said support bore and said seating surfaces engaged against each other.

2. In a lens mount, the combination of claim 1 and further comprising complemental locating elements respectively on said support internally thereof and on said sleeve end portion for predeterminately relatively angularly positioning the same and engageable and disengageable with relative axial movement of said support and sleeve.

3. In a lens mount, the combination of claim 1 and further comprising said support member being internally screwthreaded for the interchangeable mounting of an externally screwthreaded and shouldered lens sleeve on said support, and complemental key and keyway elements respectively on said support internally thereof and on said end portion of said first mentioned lens sleeve for predeterminately relatively angularly positioning the same and said key element being spaced inwardly from said support seating surface to permit the mounting of said second mentioned lens sleeve on said support.

4. In a lens assembly adapted to be mounted on an axially bored externally screwthreaded support provided with an axially facing annular seating surface, the combination of a lens sleeve provided with an axially facing annular seating surface engageable against said first mentioned seating surface and provided with an axially facing external annular shoulder spaced inwardly of and facing oppositely with respect to said second mentioned seating surface, and an internally screwthreaded ring rotatable on said lens sleeve and provided with an internal annular axially facing shoulder engageable against said first mentioned shoulder, said ring being adapted to be screwthreaded on said support to mount said lens sleeve thereon with said seating surfaces engaged against each other.

5. In a lens assembly, the combination of claim 4 and further comprising a locating element on said lens sleeve and engageable with a complemental locating element on said support for predeterminately angularly positioning the same on said support.

6. In a lens assembly adapted to be mounted on an axially bored externally screwthreaded support provided with an axially facing annular seating surface, the combination of a lens sleeve provided with an end portion engageable within the bore of said support and provided with an external circumferential flange inwardly of said end portion and providing oppositely axially facing shoulders of which the shoulder facing in the direction of said end portion provides a seating surface engageable against said first mentioned seating surface when said sleeve end portion is engaged in said support bore, and an internally screwthreaded ring rotatable on said lens sleeve and overlying said flange and provided with an internal annular axially facing shoulder engageable against the other of said flange shoulders, said ring being adapted to be screwthreaded on said support to mount said lens sleeve thereon with said sleeve end portion engaged in said support bore and said seating surfaces engaged against each other.

7. In a lens assembly, the combination of claim 6 and further comprising said sleeve end portion being provided with a locating keyway engageable with a key on said support for angularly positioning said sleeve on said support.

References Cited in the file of this patent
UNITED STATES PATENTS

| | | |
|---|---|---|
| 1,848,402 | Wollensak | Mar. 8, 1932 |
| 1,880,635 | Wollensak | Oct. 4, 1932 |
| 1,923,376 | Howell | Aug. 22, 1933 |
| 2,532,300 | Harvey | Dec. 5, 1950 |
| 2,536,500 | Hinden | Jan. 2, 1951 |
| 2,547,576 | Guinchard | Apr. 3, 1951 |